April 24, 1951 P. C. HUTTON 2,550,564
APPARATUS FOR ASSEMBLING RUBBER BEARINGS
Filed Aug. 5, 1947 2 Sheets-Sheet 1
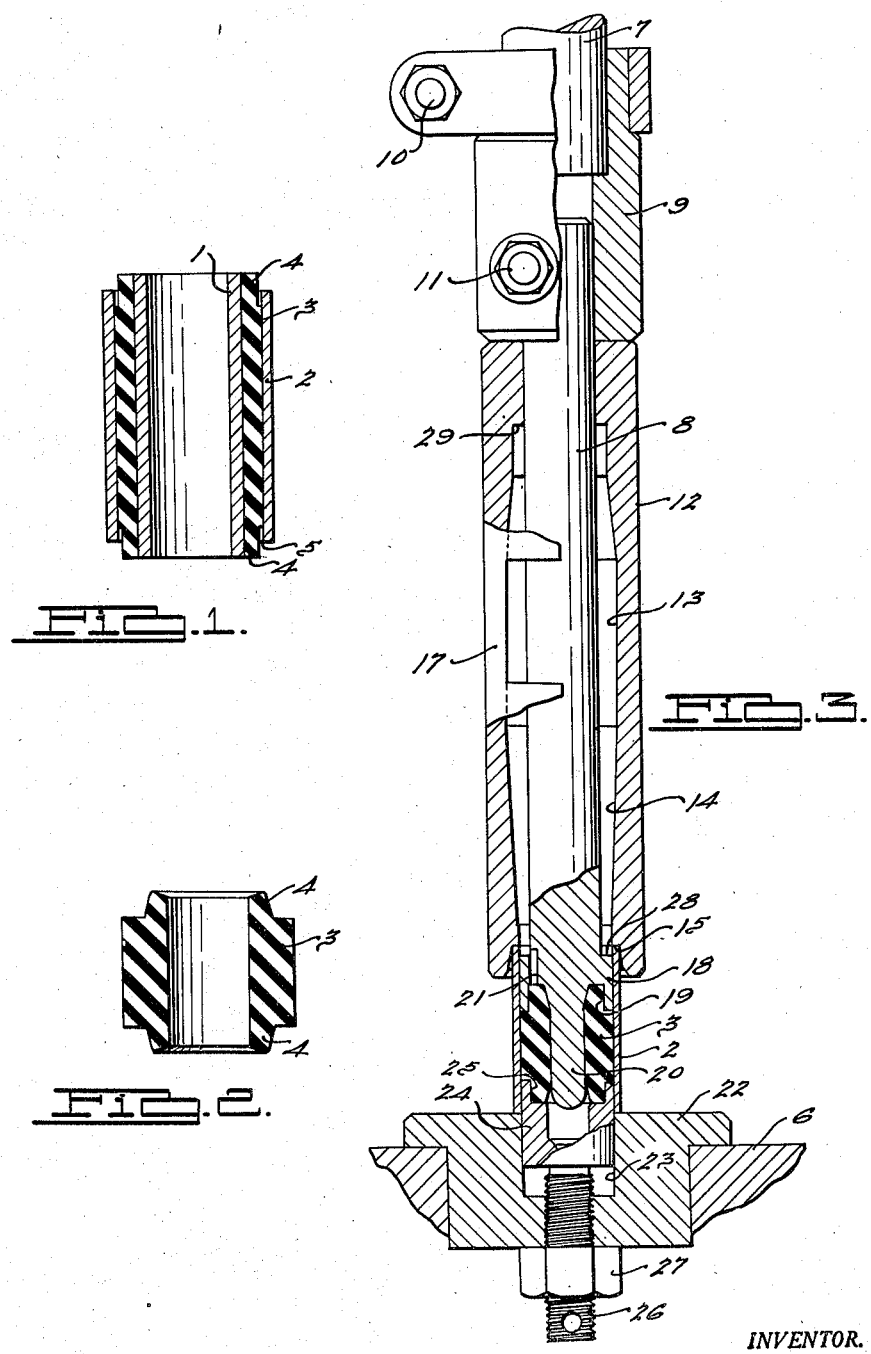
INVENTOR.
Philip C. Hutton.
BY
Harness, Dickey & Pierce
ATTORNEYS.

April 24, 1951 P. C. HUTTON 2,550,564
APPARATUS FOR ASSEMBLING RUBBER BEARINGS
Filed Aug. 5, 1947 2 Sheets-Sheet 2
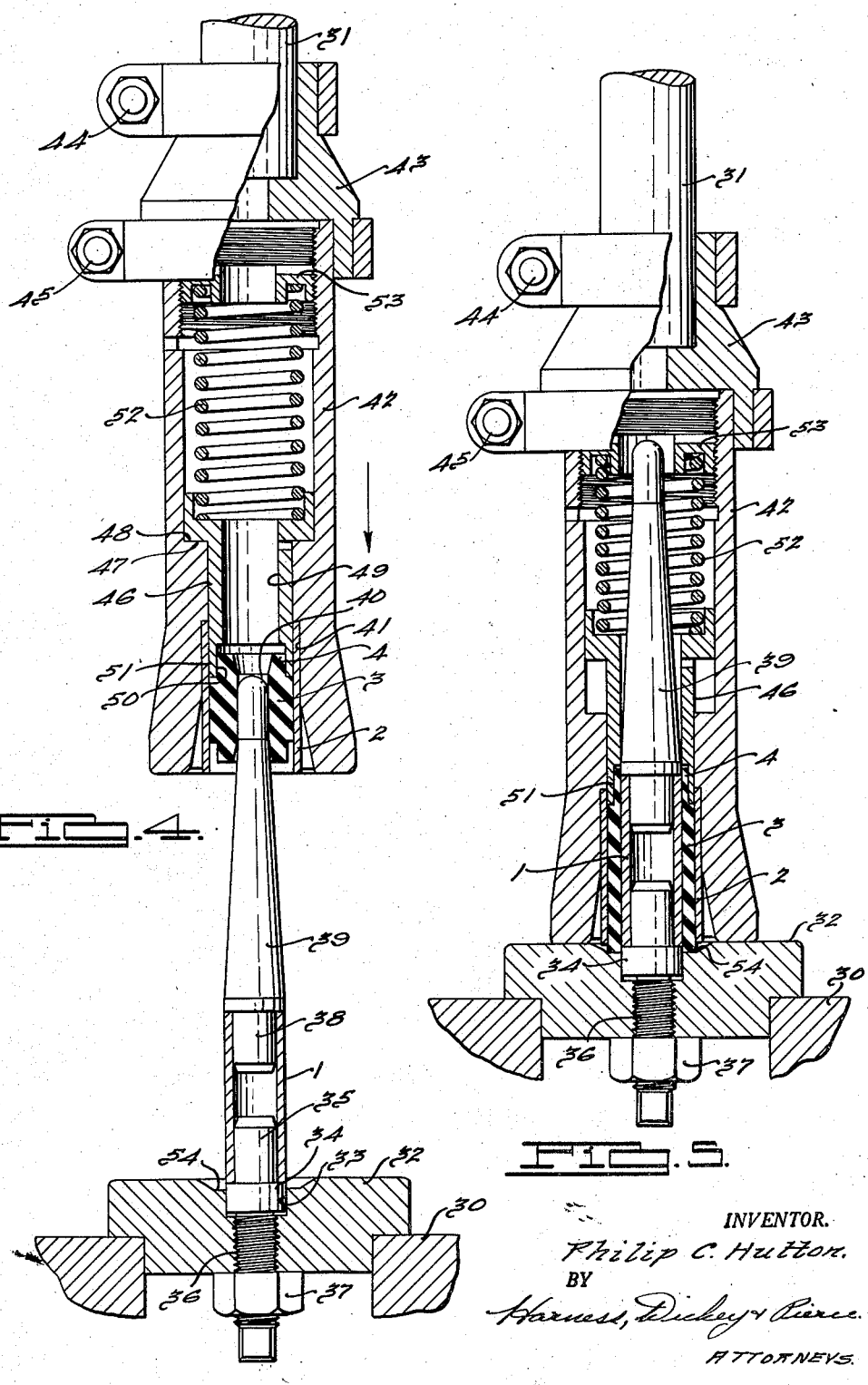
INVENTOR.
Philip C. Hutton.
BY
Harness, Dickey & Pierce.
ATTORNEYS.

Patented Apr. 24, 1951

2,550,564

UNITED STATES PATENT OFFICE 2,550,564

APPARATUS FOR ASSEMBLING RUBBER BEARINGS

Philip C. Hutton, London, England, assignor to Silentbloc, Limited, London, England, a company of Great Britain Application August 5, 1947, Serial No. 766,204

3 Claims. (Cl. 29—235)

The present invention relates to an apparatus for and method of assembling rubber bearings of the type employing external and inner concentric cylindrical bearing members having a radially compressed and axially elongated yielding rubber bushing therebetween.

In the past, rubber bearings of the type mentioned have usually been assembled by two operations. In the first operation, the rubber bushing is inserted within the outer bearing member by forcing it through a conical funnel, which reduces the outside diameter of the bushing. The inner bearing member is then fitted on the rear end of a conical punch and the punch is forced through the opening in the bushing to expand its internal diameter and insert the inner member within the bushing. This reduces the radial thickness of the bushing and (since rubber, like a liquid, is substantially incompressible) correspondingly increases its axial length. Where accurate lengthwise positioning of the bushing between the bearing members is not important, it has been found that satisfactory location is achieved merely by performing the above two operations at high speed in the presence of a suitable lubricant, such as water or petroleum jelly.

However, where lengthwise location is critical, other expedients must be relied upon. For this purpose, it has been proposed that during the second operation one end of the bushing be engaged by an annular shoulder which limits axial movement of the bushing under the frictional forces induced by passage of the punch through the bushing. This, however, does not positively locate the bushing, because there can be no assurance that the bushing will be moved against the shoulder. In addition, difficulties are encountered with a tendency to pinch a part of the rubber bushing between the punch and the annular shoulder.

The above difficulties are greatly aggravated in the production of the form of bearing disclosed in applicant's copending application on "Rubber Bearing," Serial No. 766,205, filed concurrently herewith, now Patent No. 2,517,791, August 8, 1950, in which the bushing has end extensions which project beyond the ends of the outer bearing member and which should end in a fixed position lengthwise with respect to the inner member in order to co-operate with abutment shoulders which are subsequently fixed to the inner member.

Accordingly, it is one object of the present invention to provide improved means and method for positively locating the rubber bushing lengthwise with respect to the bearing.

Another object of the invention is to prevent the possibility of pinching the rubber bushing during the assembly operation.

A further object of the invention is to provide improved means for insuring proper location of the rubber bushing in the external bearing member during the first operation.

Another object of the invention is to provide an apparatus of the type mentioned and an assembly method which are peculiarly suited to the assembly of the type of bearing disclosed in applicant's above mentioned application.

Other objects and advantages of the invention will become apparent from the following specification, the accompanying drawings and the appended claims.

In the drawings:

Figure 1 illustrates the form of bearing disclosed in applicant's above mentioned copending application, for which the preferred form of mechanism illustrated and described herein is employed;

Figure 2 shows the free state of the rubber bushing employed in the bearing in Figure 1;

Figure 3 is a longitudinal sectional view showing the mechanism employed in performing the first assembly operation;

Figure 4 is a longitudinal section showing the mechanism employed in performing the second assembly operation; and Figure 5 is a view similar to Figure 4, showing the parts in the position they occupy at the end of the assembly operation.

As set forth in greater detail in applicant's above mentioned copending application, the form of bearing illustrated in Figure 1 comprises an inner sleeve 1 and an outer sleeve 2 between which is positioned a yieldable rubber bushing 3. The rubber bushing 3, as best shown in Figure 2 in its free state, is of substantially greater radial thickness at its central portion than the space between the sleeves 1 and 2, with the result that on assembly the central portion is compressed radially and elongated axially to a substantial extent. The bushing 3 is also provided with end sections 4, which, in the assembled bearing, project beyond the ends of the outer sleeve 2 and lie partially within the ends of the outer sleeve. The outside diameter of the extensions 4 is slightly less than the inside diameter of the external sleeve 2, with the result that there is provided a small clearance space 5 between the inner portions of the extensions 4 and the outer sleeve.

This clearance, as set forth in said application, greatly enhances the axial load carrying capacity of the bearing.

The internal diameter of the rubber bushing 3 is less than the external diameter of the internal sleeve 1, with the result that it is necessary to expand the bushing in order to assemble it on the inner sleeve.

In the first operation, the rubber bushing 3 is inserted within the external sleeve 2 by the mechanism illustrated in Figure 3. As there shown, the mechanism comprises a press of any suitable construction having a bed or platen 6 and a plunger 7. In accordance with conventional construction, the plunger 7 is movable toward and away from the platen by any suitable means, such as an air cylinder (not shown). The parts are shown in the position in which the plunger 7 has moved to its maximum extent toward platen 6. The plunger 7 is secured to a pusher 8 by any suitable means, such as a collar 9 which is clamped to the plunger and pusher by means of bolts 10 and 11. Surrounding the pusher 8 is a housing 12 having an enlarged cylindrical bore 13, the lower end of which merges with the upper larger end of a frusto-conical funnel-shaped bore 14, the lower smaller extremity of which is of the same internal diameter as the internal diameter of the outer sleeve 2 of the bearing. The housing 13 is provided adjacent its lower end with a counterbore of the same diameter as the external diameter of the outer sleeve 2, which counterbore terminates in a shoulder 15, adapted to engage the end of the outer sleeve. The central cylindrical bore 13 in housing 12 has at one side an opening 17 of sufficient size to permit insertion of the rubber bushing shown in Figure 2.

It will be appreciated that the housing 12 is slidable on the pusher 8 and that when the press is open the lower extremity of the pusher 8 is located above the opening 17, thus permitting insertion of the bushing 3 through the opening 17.

The lower end of the pusher 8 is provided with an enlarged head 18 of the same diameter as the internal diameter of the sleeve 2. The head 18 has an annular counterbore 19, adapted to receive the projection 4 of one end of the bushing, and a central pilot 20, which is adapted to project within the central opening in the bushing. The pilot 20 is of approximately the diameter which the central opening in the bushing will assume when the bushing is inserted within the sleeve 2. An air outlet passageway 21 is provided within the head 18 to permit discharge of air trapped within the annular counterbore 19.

The platen 6 is provided with a die 22 having a central bore 23 in which is fitted an adjustable head 24, adapted to engage the lower extremity of the bushing upon the completion of the first assembly operation. The head 24 is provided with a counterbore 25, adapted to receive the extension 4 on the lower end of the bushing. The head 24 is adjustable by means of a screw 26, which is threaded within the die 22 and locked in position by means of a nut 27.

In operation, the mechanism shown in Figure 3 forms the first assembly operation in the following manner. When the press is fully open, the shoulder 28 on the head 18 of the pusher engages an internal shoulder 29 within the housing 12 and slightly elevates the housing to permit the insertion of the sleeve 2 over the end of the head 24 in the position shown in the drawing. Bushing 3 is then inserted through the opening 17 and is held in approximately the proper position in alignment with the pilot 20 on the then elevated pusher 8 by its engagement with cylindrical bore 13 of the housing. The press is then operated to cause the plunger 7 and pusher 8 to move downwardly. This permits the housing 12 to move downwardly over the upper end of sleeve 2, as shown in Figure 3. As the plunger continues to move downwardly, the pilot 20 enters the bushing 3 and the head 18 forces the bushing downwardly through the frusto-conical funnel 14 and into the sleeve 2. This radially contracts and to a limited degree axially elongates the bushing 3 to the form illustrated in Figures 3 and 4. The downward movement of the bushing is limited by its engagement with the head 24, thus insuring proper lengthwise location of the bushing relative to the sleeve. The pilot 20 and annular recess 19 in the head 18 serve to prevent cocking or wrinkling of the bushing during the operation, which might otherwise result.

On completion of the first operation, the press is opened and the sleeve 2, with its associated bushing 3, is removed from the mechanism and transferred to the mechanism shown in Figures 4 and 5, which performs the second operation.

The second operation, which involves the insertion of the inner sleeve 1 within the central opening in the bushing 3 and a consequent substantial radial expansion of the bushing 3, is carried out on a press similar to that employed in connection with the first operation but employing different tooling. Thus, as shown in Figure 4, the press includes a bed or platen 30 and a plunger 31, which is adapted to be moved toward and from the platen 30 in any suitable manner. Mounted on the platen is a die 32 having a central bore 33 in which is fitted a head 34 having a vertical extending pilot 35. The head 34 is secured in position on the die by means of a threaded stud 36, which is threaded into the die and locked in position relative thereto by a nut 37. The inner sleeve 1 of the bearing is inserted over the pilot 35 when the press is open, and the reduced pilot end 38 of a tapered plunger 39 is then fitted within the upper end of the sleeve 1, so that these parts assume the relative positions shown in Figure 4. It will be understood that at that time the plunger 31 and associated parts, hereinafter described, are in their fully raised position and, therefore, located entirely above the rounded end 40 of the tapered plunger 39.

During the second assembly operation, the outer sleeve 2, with its associated bushing 3, is supported within a cylindrical counterbore 41 formed in the lower end of a housing 42, which is fixed to the plunger 31 by means of a collar 43, the collar being clamped to the plunger and housing by means of bolts 44 and 45 and associated straps.

Slidably fitted within the housing 42 is a piston 46 with the same external diameter as the internal diameter of the external sleeve 2. The piston 46 at its upper end is provided with an enlarged shoulder 47 adapted to seat against a corresponding internal shoulder 48 formed within the housing. Piston 46 is of annular construction, having a central cylindrical bore 49 of sufficient diameter to receive the lower end of the tapered plunger 39, which is of the same diameter as the external diameter of the inner sleeve 1. The piston 46 adjacent its lower end is also provided with a counterbore 50 adapted to receive the annular extension 4 on the bushing 3 before the bushing is expanded by the punch 39.

An important feature of the invention rests in the fact that the counterbore 50 is of greater axial length than the length of the extension 4 and the resulting projecting end 51 of piston 46 is of less radial thickness than the radial distance between the inner and outer sleeves 1 and 2 on assembly and greater than the relatively small clearance space 5 in the assembled bearing.

The annular piston 46 is urged downwardly by relatively heavy spring 52, the upper end of which is seated against an adjustable collar 53, which is threaded within an upper threaded portion of the housing 42.

The operation of the mechanism shown in Figure 4 is as follows. With the press completely open, the external sleeve 2, with its associated bushing 3, is fitted over the end of the tapered punch 39 and thus held in alignment with the flared mouth of the recess 41. The press is then closed. The upper end of sleeve 2 is first seated within the recess 41 surrounding the lower end of piston 46 and the projection 4 extends into the counterbore 50. Thereafter the press forces the sleeve and bushing 3 downwardly over the tapered plunger 39 and inner sleeve 1, until the parts assume the position shown in Figure 5, in which the lower end of the housing 42 and outer sleeve 2 are seated against the upper surface of the die 32. This greatly expands the inner diameter of the bushing 3 and causes it to elongate axially. Before the parts reach the position in Figure 5, the lower end of the bushing 3 abuts against the bottom of a shallow recess 54 formed in the die 32.

Prior to such engagement and during the downward movement of the plunger, the frictional force exerted on the rubber bushing 3 by the tapered plunger 39 and the sleeve 1 tends to force it upwardly relative to the external sleeve, but the strength of the spring 52 is more than sufficient to overcome such force, with the result that the upper end of the bushing 3 is held against movement axially with respect to the external sleeve to the position shown in Figure 4 until after the lower end of the bushing engages the bottom of the recess 54. Thereafter, as the plunger continues to move downwardly, the body of the rubber constituting the bushing 3 is completely enclosed. Since rubber, like other liquids, is substantially incompressible, it must, therefore, expand in an axial direction upwardly with reference to the sleeve 2. Consequently, during the final closing movement of the press, the rubber bushing 3 expands upwardly, forcing the piston 46 upwardly relative to housing 42 against the force exerted by the spring 52, as indicated by the final position of the parts illustrated in Figure 5.

Since the bottom of the recess 54 is in a fixed position relative to the lower ends of sleeves 1 and 2, it will be apparent that the apparatus results in a positive lengthwise location of the bushing relative to the sleeves. Since in producing the form of bushing shown in Figure 1 it is desirable to have the rubber bushing terminate flush with the ends of the inner sleeve 1, this relationship may be insured by vertical adjustment of head 34 relative to the die 32.

In assembling the form of bushing shown in Figure 1, it is essential that the extremity of piston 46 engage the shoulder on the bushing at the juncture of the central body portion of the bushing and the reduced extremity 4 in order to positively locate the compressed central portion of the bushing in spaced relation to the ends of the outer sleeve. On the other hand, when the radial clearance space 5 in the assembling is as small as that illustrated in Figure 1, it is not possible to provide an annular piston having a radial thickness as small as the clearance space since, in that case, the piston might be forced into a position between the enlarged central portion of the bushing and the external sleeve and be caught by the relatively high radial pressure exerted by the compressed rubber. In addition, even in the absence of extensions 4, it is not possible to provide a piston 46 having its annular extremity of the same radial thickness as the space between the inner and outer sleeves 1 and 2 since, in that case, there would be danger of pinching a portion of the rubber between the tapered plunger 39 and the inside of the piston 46. Accordingly, as previously indicated, the reduced extension 51 on the annular piston is made of a thickness greater than the clearance space 5 and substantially less than the space between sleeves 1 and 2. As a result, when the parts assume their fully closed position shown in Figure 5, the annular projection 4 of the bushing is radially compressed and axially elongated beyond the upper end of the inner sleeve 1, in the manner shown in the drawing. When the press is opened and the completed bushing extracted from the housing 42, the upper extension 4 will snap back into the position shown in Figure 1. Similarly, the lower extension 4, which will have been partially compressed and flattened by the bottom of the recess 54, will likewise assume the position shown in Figure 1 if the height of the head 34 is properly adjusted with respect to the die 32.

By providing the counterbore 50 in the annular plunger 46 into which the extremity of the bushing may expand without being pinched by the tapered plunger 39, the apparatus of the present invention eliminates the difficulties encountered with prior attempts to utilize shoulders to help locate the bushing in proper longitudinal position and at the same time produces an assembled bearing in which the bushing is positively located lengthwise with respect to both sleeves.

The apparatus of the present invention may be employed with success to assemble radially compressed bushings which do not have projecting end portions 4. In such case, the upper end of the bushing would terminate flush with the lower end of the annular piston 46 when the parts are in the position shown in Figure 4. It is still essential, however, to provide the counterbore 50 to prevent pinching of the rubber between the piston and the plunger 39.

While in Figures 4 and 5 the tapered plunger 39 is shown mounted on the die by means of the inner bearing member which is being inserted, it will be apparent that it may be made of sufficiently small diameter to receive the inner bearing member and be mounted on the die independently of the bearing member, provided the end of the bearing member is suitably chamfered or a separate chamfered ring is placed on the cylindrical shank of the plunger 39 immediately above the inner bearing member to facilitate entry of the bearing member into the bushing.

It will be apparent that while, as described above, the apparatus is mounted vertically with a stationary platen and an upper movable plunger, the relative position of the parts may be reversed or the apparatus may be mounted horizontally. In addition, either the platen or the plunger may remain stationary and the other moved relative thereto without departing from the principles or advantages of the invention.

It will be understood that in accordance with conventional practice in assembling radially compressed bushings, it is desirable to operate the press at high speeds, preferably by air pressure, and that a suitable lubricant, such as water or petroleum jelly, may be employed to reduce friction between the inner and outer sleeves and the rubber bushing during the assembling operations.

While only one form of invention is illustrated and described herein, it will be apparent that variations in the details of the design and construction may be indulged in without departing from the spirit of the invention or the scope of the appended claims.

What is claimed is:

1. An apparatus for holding an outer bearing member having a rubber bushing fitted therein during the insertion of an internal bearing member of a diameter larger than the internal diameter of the bushing and provided with a pointed pilot endpiece adapted to expand the bushing during insertion, said apparatus comprising a supporting member adapted to engage one end of the outer bearing member and hold it against axial movement in one direction relative to the supporting member and an abutment member carried by the supporting member and having an annular end portion adapted to engage the corresponding end of the bushing, said end portion having an external diameter which will closely fit within the outer bearing member and an internal diameter which is materially greater than the external diameter of the inner bearing member.

2. An apparatus for holding an outer bearing member having a rubber bushing fitted therein during the insertion of an internal bearing member of a diameter larger than the internal diameter of the bushing and provided with a pointed pilot endpiece adapted to expand the bushing during insertion, said bushing having an annular axial projection of reduced outside diameter forming a shoulder at one end, said apparatus comprising a supporting member adapted to engage one end of the outer bearing member and hold it against axial movement in one direction relative to the supporting member, and an abutment member carried by said supporting member and having an annular end portion adapted to engage the corresponding end of the bushing, said end portion having an external diameter which will closely fit within the outer bearing member and an internal diameter which will fit over the bushing projection prior to insertion of the internal bearing member.

3. Apparatus for holding an outer bearing member having a rubber bushing fitted therein during the insertion of an internal bearing member of a diameter larger than the internal diameter of the bushing and provided with a pointed pilot endpiece adapted to expand the bushing during insertion, said bushing having an annular axial projection of reduced outside diameter forming a shoulder, said apparatus comprising a support adapted to engage one end of the outer bearing member and hold it against axial movement in one direction, an annular piston carried by and slidable with respect to said support, said piston having an annular axially projecting portion adapted to engage the shoulder at the corresponding end of the rubber bushing and form an axial abutment therefor, said portion having an external diameter which will closely fit within the outer bearing member and an internal diameter at its bushing engaging end which is materially greater than the external diameter of the inner bearing member and which is less than the external diameter of said bushing projection in the completed bearing, resilient means carried by said support and acting on said piston in a direction to urge the piston against the bushing, and means for limiting movement of said piston in said one direction relative to said supporting member.

PHILIP C. HUTTON.

REFERENCES CITED

The following references are of record in the file of this patent:

UNITED STATES PATENTS

| Number | Name | Date |
| --- | --- | --- |
| 1,062,626 | Wiedrich | May 27, 1913 |
| 1,739,270 | Thiry | Dec. 10, 1929 |
| 1,904,931 | Rosenberg | Apr. 18, 1933 |
| 1,913,933 | Lamborn et al. | June 13, 1933 |
| 1,959,254 | Zerk | May 15, 1934 |
| 2,003,412 | Alden et al. | June 4, 1935 |
| 2,031,797 | Tarbox | Feb. 26, 1936 |
| 2,115,437 | Welker | Apr. 26, 1938 |
| 2,379,508 | Dodge | July 3, 1945 |